Feb. 22, 1944.   W. T. HURTT   2,342,199
METHOD OF AND APPARATUS FOR ROLLING AND
COOLING ALUMINUM AND OTHER METALS
Filed Oct. 30, 1941
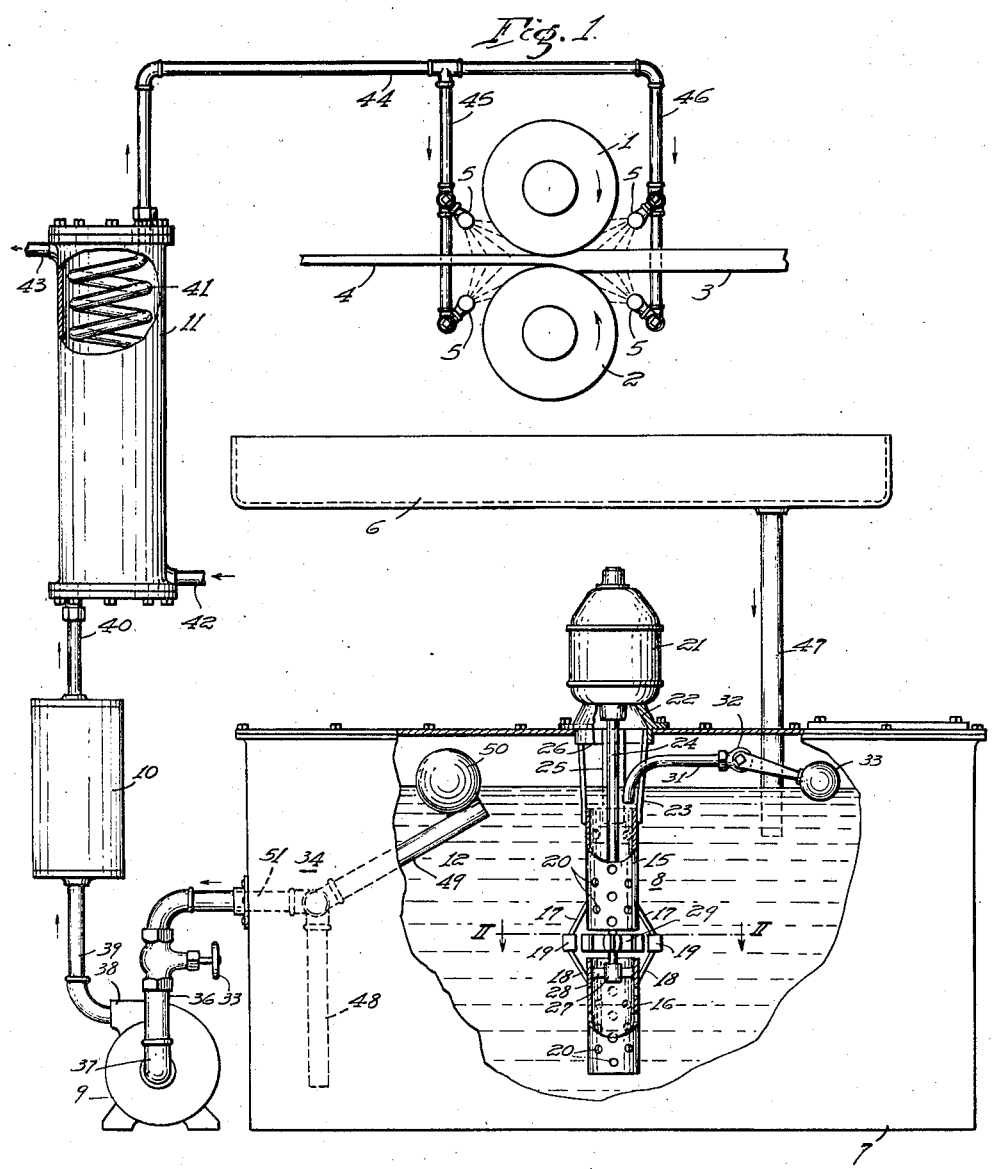
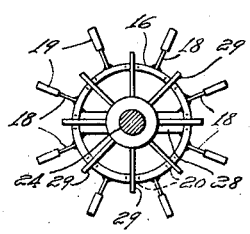
WITNESS
INVENTOR
William T. Hurtt
BY
William R. Coley
ATTORNEY Patented Feb. 22, 1944

2,342,199

UNITED STATES PATENT OFFICE 2,342,199

METHOD OF AND APPARATUS FOR ROLLING AND COOLING ALUMINUM AND OTHER METALS

William T. Hurtt, Crafton, Pa.

Application October 30, 1941, Serial No. 417,066

10 Claims. (Cl. 80—1)

My invention relates to methods and apparatus for cold rolling and cooling aluminum and other metals and has particular relation to such rolling and cooling of these metals at high speed without leaving any water stains thereon.

At the present time steel is rolled at satisfactorily high speeds through the application of the well-known cooling properties of water. The coolant usually employed by a high speed cold reduction strip steel mill consists, in general, of soluble oil and water. At high speed rolling a large quantity of heat must be dissipated and this result cannot be accomplished by merely increasing the temperature of the liquid, in spite of the high capacity of water in liquid form for removing heat. It is only made possible by the use of an oil and water mixture in which the benefits of the latent heat of steam may be obtained. As the coolant is sprayed over the rolls and metal sheet of a high speed cold reduction steel mill, the water in the coolant is evaporated rapidly and removes the heat in the form of steam. For every pound of water evaporated in this manner, approximately 970 B. t. u.'s are dissipated from the mill. Some of the highest speed cold strip mills are equipped with hoods over the roll stands and with large fans to draw away the steam. The coolant used in such mills is a soluble oil and water mixture constituting an oil-in-water emulsion which permits the water to come in contact with the sheet being rolled and thus provides the desired heat-removing capacity by reason of the conversion of the water portion of the coolant into steam, as noted above, together with the high capacity of water in liquid form for removing heat.

However, it is not possible to use this type of oil and water emulsion or mixture in connection with the rolling of aluminum or like metals, since it is an oil-in-water emulsion and leaves an objectionable water stain thereon. As a result, while steel may be rolled at 2000 to 3000 feet per minute, a rolling speed of aluminum of 500 feet per minute at the present time is considered high. Oil alone has been used in rolling aluminum on account of the staining by water. In the modern aluminum cold reduction strip mill, the most satisfactory coolant employed in the prior art is a light bodied mineral oil compounded with 5% to 25% of animal oil, vegetable oil or fish oil. Such oil alone has relatively poor heat-removing properties, as compared with water, and thus the type of coolant employed in rolling aluminum strip accounts to a great extent for the difference in speed of operation of steel strip and aluminum strip mills and the unsatisfactorily low speed of production of such aluminum strip.

One object of my invention, therefore, is to use the desirable high cooling properties of water in rolling aluminum or the like while preventing contact of the water with the aluminum because of the continual presence of an intervening layer of oil. In this way satisfactorily high speed of aluminum rolling may be obtained, since the necessary removal of heat is secured through the evaporation of water, plus the higher capacity of water in liquid form for removing heat, and still no staining of the aluminum occurs since the water does not come in contact therewith.

Another object of my invention is to provide a method of rolling and cooling aluminum and other metals at high speed without leaving water stains thereon which comprises the step of applying to the rolls and the aluminum being rolled a fluid having small bodies of water entirely surrounded by oil.

A further object of my invention, in one of its aspects, is to utilize for the purpose set forth a preferably temporary water-in-oil emulsion which thus provides the desired cooling and non-staining properties, thereby permitting high speed rolling of aluminum. By "temporary," I mean an emulsion produced in whole or in part by a mechanical emulsifier, rather than a permanent emulsion produced in its entirety by chemical action.

Still another object of my invention is to provide a method of rolling and cooling aluminum and other metals by producing a mechanical mixture of oil and water, the oil forming an envelope for the water and applying the mixture to the rolls and strip, thereby to prevent contact of the water with the aluminum while transferring heat from the aluminum through said oil envelope to said water.

A further object of my invention is to provide a relatively inexpensive apparatus for producing and delivering a continuous stream of suitable coolant of the character set forth above for application to aluminum strip and the like, and to the rolls therefor, thus permitting satisfactory production of such strip at high speed.

Other objects of my invention will become evident from the following detailed description taken in conjunction with the accompanying drawing, in which:

Figure 1 is a view in end elevation of an apparatus organized in accordance with the present invention for the purpose of delivering a suitable water-in-oil emulsion to an aluminum strip mill and the like and to the rolls therefor; and Fig. 2 is an enlarged sectional view, taken along the line II—II of Fig. 1.

I desire it to be understood that either a temporary water-in-oil emulsion or a permanent water-in-oil emulsion may be used in accordance with the present invention. A temporary emulsion, as defined above, is one produced in whole or in part by a mechanical emulsifier, such as hereinafter set forth and designated generally by reference character 8. A permanent emulsion is produced by the use of certain chemicals, as well known in the art and, if a permanent emulsion is prepared at another place and furnished to the cooling system, no mechanical emulsifier is necessary. However, while both types of emulsion may be employed in the present invention, the temporary type is preferred primarily because it is less expensive. On the other hand, if desired, a certain proportion of permanent emulsion may be supplied to the system and mixed with oil before being acted upon by the mechanical emulsifier, as will be understood.

Referring to the drawing, the apparatus there shown comprises a pair of mating rolls 1 and 2 of a rolling mill, for example, which act upon a sheet, strip or bar of aluminum or other like metal 3 to reduce its thickness, as indicated at 4, a plurality of rows of spray nozzles 5 being provided for applying my water-in-oil emulsion coolant to each side of each roll and to each side of the strip before, during and after rolling. A suitable trough or pit 6 is provided for receiving or collecting the coolant after passing over the rolls 1 and 2 and the metal strip portions 3 and 4, this coolant being delivered to a suitable receiving tank 7 which is provided with a mechanical agitator, mixer of emulsifier 8 should a temporary water-in-oil emulsion be used. The coolant is withdrawn from the tank 7 by a suitable centrifugal pump 9 and is passed through a suitable filter 10, if desired, and heat exchanger or cooler 11, if desired, from which it is delivered to the spray nozzles 5 for the purpose set forth.

The fluid 12 in the tank 7 may consist of a quantity of the oil mentioned above as employed for rolling aluminum strip at the present time, namely, a light bodied mineral oil compounded with a small percentage of animal and vegetable oils and fats, which is passed through the emulsifier 8 along with water in the tank to produce a temporary water-in-oil emulsion or mechanical mixture containing from 5% to 80% water.

The mixer, agitator or emulsifier 8 may be of any suitable form and is shown as comprising a plurality of substantially vertically-alined tubular members 15 and 16 which are spaced a certain distance apart and are secured to each other by means of a plurality of angularly-disposed arms or struts 17 and 18, the confronting ends of which are secured to suitable stationary baffles or vanes 19. The tubular members 15 and 16 are provided with a plurality of suitable holes or openings 20 to permit the passage of oil and water therethrough.

A suitable electric motor 21 or other power-driven device is mounted, by means of a suitable bracket or pedestal 22, on top of the tank 7, and the upper end of the upper tubular member 15 is suitably secured to a plurality of suitable arms or brackets 23, the upper ends of which are secured to the bracket or pedestal 22 or they may be otherwise secured to the top plate of the tank 7.

A shaft 24, preferably forming an extension of the shaft for the motor 21, extends downwardly through a bearing 25 located within the bracket members 23, being suitably held in position by means of a spider 26, for example, which is suitably fastened to the brackets 23. The shaft 24 terminates in a lower bearing 27 which may be secured by a spider 28 to the lower tubular member 16 near the top thereof.

The purpose of the shaft 24 is to impart rotational movement to a suitable paddle wheel or set of vanes 29 mounted on the shaft in the above-mentioned space between the upper perforated tubular member 15 and the lower similar member 16. It will be noted that the stationary vanes or baffles 19 are located in substantially the same plane as the paddle wheel 29 for a purpose to be set forth.

Upon operation of the motor 21 at the proper speed, the cooperation of the paddle wheel 29 and the stationary vanes 19, together with the perforated tubular members 15 and 16, respectively located above and below the paddle wheel, causes a churning or agitation of the bodies of oil and water in the tank 7, whereby a temporary water-in-oil emulsion or mechanical mixture is provided, that is, drops of water are entirely surrounded by an enveloping body of oil. As noted above, the percentage of water may be from 5% to 80%, preferably 20–40%. The approximate percentage of water that will best emulsify with the oil may be readily determined by experiment; but once established, measuring the specific gravity of the emulsion will be the best guide to maintain the desired percentage of water therein.

As mentioned above, some of the water and oil in this emulsion is carried away on the sheets and other water is evaporated upon coming into contact with the hot rolls and aluminum strip. Therefore, although only a small percentage of the total amount of water and oil present in the emulsion is lost, it is necessary to provide an additional supply of water and oil from time to time. One convenient way of automatically providing this additional water and oil is through the use of a pipe or conduit 31 located inside the tank 7 which is provided with a suitable proportioning valve 32 of any well-known type. The valve is automatically opened and closed in accordance with the level of the fluid in the tank 7 by means of a float ball 33. Consequently, as the level of the fluid in the tank 7 decreases, by reason of using up water and oil in the process, the float valve 32 is opened to admit sufficient "make-up" water and oil through pipe 31 within the emulsifier 8. However, it is not necessary to utilize this valve in order to obtain the benefits of my invention, as the required "make-up" of water and oil may be added intermittently in some other manner.

For the purpose of withdrawing the above-mentioned temporary water-in-oil emulsion from the tank 7, a suitable outlet pipe structure 34 is provided inside the tank. Preferably two outlet paths are arranged, comprising a pipe 48 extending downwardly toward the bottom of the tank and a second pipe 49 extending upwardly at an angle and loosely mounted on the structure, the upper end of pipe 49 having a suitable float 50 attached thereto. In this way the movable pipe 49 is maintained at a suitable distance below the surface of the fluid in tank 7.

It will be noted that by the provision of the dual outlet structure just described, it is insured that quantities of the emulsion are taken from near both the top and the bottom of the tank, the emulsion near the top being normally richer in oil and the emulsion near the bottom having a greater proportion of water.

From the outlet structure 34 pipes 51 and 36 lead to the inlet 37 of the centrifugal pump 9. If desired, a hand-operated shut-off valve 33 of any well-known type may be inserted in pipe 36. The outlet 38 of pump 9 is connected through a pipe 39 to a suitable filter 10 if it is desired to filter the fluid.

A pipe 40 leads from the filter 10 to a cooler or heat exchanger 11 (if it is desired to use the same) which may be provided with a suitable coil 41 for connecting the inlet pipe 40 to the outlet pipe 44. For the purpose of providing a desirable heat exchange in apparatus 11, cool water from the city mains or other suitable source may be admitted at lower pipe 42 of the cylindrical tank portion of the apparatus 11 and withdrawn at the upper outlet pipe 43.

From the pipe 44 at the delivery side of the cooler 11, the temporary or permanent water-in-oil emulsion is transmitted to pipes 45 and 46, each of which is shown as provided with two rows or sets of spray nozzles 5, one row or set being above the aluminum strip and the other below.

It will be noted that the position of the nozzles 5 is such that, in the case of the nozzles associated with the pipe 46, the upper one and the lower one spray and cool the approaching sides of the rolls 1 and 2 respectively (as indicated by the dotted arrows) and they also lubricate and cool the upper and lower surfaces respectively of the strip 3 as it enters the rolling mill. The spray nozzles 5 associated with the other pipe 45 are located so that the receding sides of the rolls 1 and 2 are sprayed and cooled by the coolant, which also lubricates and cools the upper and lower surfaces of the strip 4 after being reduced in thickness. It will be understood that one or more additional sets of rolls, spray nozzles, etc., may be employed, if desired, in accordance with a familiar practice. Moreover, if desired, only two sets of spray nozzles such as those on pipe 46 (the approach side) may be used.

The temporary water-in-oil emulsion produced as above, or a permanent water-in-oil emulsion if prepared at another place and placed in tank 7 (in which case no mechanical emulsifier 8 is necessary), after being sprayed onto the rolls and surfaces of the aluminum or other metal being rolled, serves to rapidly and effectively convey heat therefrom by reason of the transmission of such heat from the aluminum strip through the intervening layer of oil to the drops of water in the temporary or permanent water-in-oil emulsion. These drops of water when raised above 212° F. are converted or flashed into steam, thus taking advantage of the well-known benefits of the latent heat of steam, and such water is thus released from its oil envelope and dissipated outwardly (that is, away from the metal). Experiments have shown that when the water drops or globules burst into steam in this manner, they do not rupture the oil film on the rolls or sheet, so that no water or steam contacts the same.

The emulsion after such use in the rolling process, (having lost some water and oil, as noted above) is received or collected in the pit or trough 6, from which a pipe 47 leads to the receiving tank 7, thus completing the described cycle or continuous process, which is indicated by the solid arrows.

From the foregoing description, it will be noted that portions of the bodies of oil and water in the tank 7 (if emulsifier 8 is used) are formed into a temporary water-in-oil emulsion which is then pumped through the system by means of the pump 9 through the filter 10, if employed, and cooler 11, if employed, to be sprayed upon the rolls and aluminum strip, at which time a small percentage of the water and oil is lost. The fluid is then collected in the trough 6 and returned to the tank 7.

In order that the process of providing the desired coolant to the rolls and strip may be continuous, the returned or retrieved emulsion and fresh water and oil as necessary—supplied through the proportioning valve 32—are formed or worked into a second temporary water-in-oil emulsion (if emulsifier 8 is used) and the process continues.

From time to time it may be desirable to test the actual percentage of water in the temporary or permanent water-in-oil emulsion, and such percentage may be tested and maintained by periodically checking the gravity of the emulsion, as previously mentioned, and adding more oil or more water as required.

It will be seen that I have thus provided a method of and apparatus for rolling and cooling strip aluminum or the like and the rolls therefor, at satisfactorily high speed, in that the cooling properties of water, including the latent heat of vaporization, may be fully employed without, however, permitting such water to contact the aluminum which would leave undesirable stains. In this way, speeds for rolling aluminum comparable to those for rolling steel may be safely and satisfactorily employed, the finished aluminum being delivered in perfect condition without any water stains.

Consequently, my process and apparatus provide for high speed rolling of aluminum strip or the like without staining the same with water and at the same time the coolant itself may be relatively inexpensive, since ordinarily only water and small amounts of oil need be periodically added thereto and the various parts of the apparatus are relatively inexpensive to operate and maintain. As previously pointed out, either a temporary water-in-oil emulsion or a permanent water-in-oil emulsion may be used.

I do not wish to be restricted to the specific structural parts or process steps set forth herein, as various modifications thereof may be effected without departing from the spirit and scope of my invention. I desire, therefore, that only such limitations shall be imposed thereon as are indicated by the appended claims.

I claim as my invention:

1. The method of cold rolling and cooling aluminum and other metals at high speed without leaving water stains thereon which comprises the step of applying to the rolls and aluminum being rolled a fluid in quantities beyond that required for lubrication having small bodies of water surrounded by oil thereby to utilize the cooling properties of said water acting on said aluminum through the intervening oil.

2. The method of cold rolling and cooling aluminum and other metals at high speed without leaving water stains thereon which consists in producing a water-in-oil emulsion and applying said emulsion in quantities beyond that required for lubrication to the surface of the rolls and aluminum being rolled thereby to utilize the cooling properties of said water acting on said aluminum through the intervening oil.

3. The method of cold rolling and cooling aluminum and other metals at high speed without leaving water stains thereon which consists in producing a temporary water-in-oil emulsion, applying said emulsion to the rolls and aluminum being rolled, the heat thereof evaporating some of the water and changing the composition of said emulsion, producing a second water-in-oil emulsion by adding water to the changed emulsion, and applying said second emulsion to said rolls and aluminum.

4. The method of cold rolling and cooling aluminum and other metals at high speed without leaving water stains thereon which consists in producing a temporary water-in-oil emulsion, applying said emulsion to the rolls and aluminum being rolled, the heat thereof evaporating some of the water and changing the composition of said emulsion, producing a second water-in-oil emulsion by adding water and oil to the changed emulsion, and applying said second emulsion to said rolls and aluminum.

5. The method of cold rolling and cooling aluminum and other metals at high speed without leaving water stains thereon which consists in producing a mechanical mixture of oil, fat, and water only, the oil forming an envelope for the water, and applying said mixture thereby to prevent contact of said water with said aluminum while transferring heat from said aluminum and rolls through said oil envelope to said water.

6. Apparatus for cold rolling and cooling aluminum and other metals at high speed comprising a pair of cooperating rolls for reducing the thickness of the aluminum, a container for a fluid having small bodies of water entirely surrounded by oil, and means for applying said fluid in quantities beyond that required for lubrication to said aluminum and rolls to convey heat therefrom through said oil to said water.

7. Apparatus for cold rolling and cooling aluminum and other metals at high speed comprising a pair of cooperating rolls for reducing the thickness of the aluminum, a container, means for producing a water-in-oil emulsion in said container, and means for delivering said emulsion in quantities beyond that required for lubrication from said container to said aluminum and rolls to utilize the cooling properties of said water acting through the intervening oil thereby to prevent the formation of water stains on said aluminum.

8. Apparatus for cold rolling and cooling aluminum and other metals at high speed comprising a pair of cooperating rolls for reducing the thickness of the aluminum, a container, means for producing a water-in-oil emulsion in said container, means for delivering said emulsion from said container to said aluminum and rolls to transfer heat from said rolls and aluminum through said oil to said water to vaporize the same, means for delivering the remaining emulsion after such use to said container, and means for adding water to said remaining emulsion in said container to be acted upon by said emulsion-producing means, whereby a second water-in-oil emulsion so produced is supplied to said delivering means.

9. Apparatus for cold rolling and cooling aluminum and other metals at high speed comprising a pair of cooperating rolls for reducing the thickness of the aluminum, a container, means for producing a water-in-oil emulsion in said container, means for delivering said emulsion from said container to said aluminum and rolls to transfer heat from said rolls and aluminum through said oil to said water to vaporize the same, means for delivering the remaining emulsion after such use to said container, and means for adding water and oil to said remaining emulsion in said container to be acted upon by said emulsion-producing means, whereby a second water-in-oil emulsion so produced is supplied to said delivering means.

10. Apparatus for cold rolling and cooling aluminum and other metals at high speed comprising a pair of cooperating rolls for reducing the thickness of the aluminum, a container, means for producing a mechanical mixture of oil and water only in said container, the oil forming an envelope for said water, and means for delivering said mixture from said container to said aluminum and rolls thereby to prevent contact of said water with said aluminum while transferring heat from said aluminum through said oil envelope to said water.

WILLIAM T. HURTT.